(12) United States Patent
Tang et al.

(10) Patent No.: US 9,088,198 B2
(45) Date of Patent: Jul. 21, 2015

(54) MOTOR

(75) Inventors: Songfa Tang, Zhongshan (CN); Jianwei Jin, Zhongshan (CN); Xiao Liu, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 174 days.

(21) Appl. No.: 13/193,635

(22) Filed: Jul. 29, 2011

(65) Prior Publication Data

US 2012/0025640 A1 Feb. 2, 2012

(30) Foreign Application Priority Data

Jul. 29, 2010 (CN) ...................... 2010 2 0282001 U

(51) Int. Cl.
| | |
|---|---|
| *H02K 9/02* | (2006.01) |
| *H02K 11/00* | (2006.01) |
| *H02K 23/66* | (2006.01) |
| *H02K 29/08* | (2006.01) |
| *H02K 5/173* | (2006.01) |
| *H02K 21/14* | (2006.01) |
| *H02K 5/22* | (2006.01) |

(52) U.S. Cl.
CPC .............. *H02K 29/08* (2013.01); *H02K 5/1735* (2013.01); *H02K 11/0073* (2013.01); *H02K 21/14* (2013.01); *H02K 5/225* (2013.01)

(58) Field of Classification Search
CPC ..... H02K 5/1735; H02K 29/08; H02K 21/14; H02K 11/0073; H02K 5/225
USPC ................ 310/68 D, 68 B, 71, 89, 59
See application file for complete search history.

(56) References Cited

U.S. PATENT DOCUMENTS

| | | | | |
|---|---|---|---|---|
| 3,500,088 A | * | 3/1970 | Geib, Jr. ......................... 310/98 |
| 3,719,843 A | * | 3/1973 | Dochterman .................... 310/89 |
| 3,841,321 A | * | 10/1974 | Albach et al. .................. 601/72 |
| 4,540,906 A | * | 9/1985 | Blom ........................... 310/67 R |
| 4,701,653 A | * | 10/1987 | Merkle et al. .................. 310/152 |
| 4,766,337 A | * | 8/1988 | Parkinson et al. .............. 310/58 |
| 5,182,482 A | * | 1/1993 | Burke ............................. 310/89 |
| 5,319,270 A | * | 6/1994 | Tanaka et al. ............... 310/67 R |
| 5,410,201 A | * | 4/1995 | Tanaka et al. ............... 310/68 B |
| 5,659,217 A | * | 8/1997 | Petersen .................. 310/156.26 |
| 5,744,880 A | * | 4/1998 | Kudoh et al. .................... 310/58 |
| 6,577,030 B2 | * | 6/2003 | Tominaga et al. .......... 310/68 B |
| 6,593,674 B2 | * | 7/2003 | Sanchez et al. ................ 310/89 |
| 6,693,422 B2 | * | 2/2004 | Lutz ........................... 324/207.2 |

(Continued)

*Primary Examiner* — Alex W Mok
(74) *Attorney, Agent, or Firm* — Matthias Scholl P.C.; Matthias Scholl

(57) ABSTRACT

A motor including a housing, a stator assembly, a rotor assembly, a controller, and a top end cover. The housing includes a cavity. The stator assembly includes a stator core and a stator winding and is housed in the cavity. The top end cover is disposed on the top of the housing. The rotor assembly includes a permanent magnet, a revolving shaft, and a rotor support. A bearing support extends inward from the center of a top end face of the top end cover, with a bearing chamber respectively provided on both ends thereof. The revolving shaft is disposed into and supports the bearing. A connection kit extends from the edge of the rotor support and outside the bearing support. The permanent magnet is disposed on the connection kit. The motor is characterized by simple and compact structure, lower cost, easy thermal dissipation, smaller axial dimension, and convenient assembly.

16 Claims, 4 Drawing Sheets

(56) References Cited

U.S. PATENT DOCUMENTS

| | | | |
|---|---|---|---|
| 6,750,573 B1* | 6/2004 | Friedman et al. | 310/59 |
| 6,762,521 B2* | 7/2004 | Peter et al. | 310/89 |
| 7,215,052 B2* | 5/2007 | Blase et al. | 310/87 |
| 8,303,274 B2* | 11/2012 | Winkler | 417/423.7 |
| 2006/0208586 A1* | 9/2006 | Guttenberger | 310/71 |
| 2007/0145839 A1* | 6/2007 | Kimura et al. | 310/68 B |
| 2007/0210655 A1* | 9/2007 | Bahr et al. | 310/54 |
| 2008/0017438 A1* | 1/2008 | Kanda et al. | 180/443 |
| 2008/0048535 A1* | 2/2008 | Bi et al. | 310/68 R |
| 2009/0155097 A1* | 6/2009 | Winkler | 417/354 |
| 2010/0050702 A1* | 3/2010 | Kim et al. | 68/23 R |

* cited by examiner

MOTOR

CROSS-REFERENCE TO RELATED APPLICATIONS

Pursuant to 35 U.S.C. §119 and the Paris Convention Treaty, this application claims the benefit of Chinese Patent Application No. 201020282001.7 filed Jul. 29, 2010, the contents of which are incorporated herein by reference.

BACKGROUND OF THE INVENTION

1. Field of the Invention

The invention relates to a motor.

2. Description of the Related Art

A conventional DC brushless motor includes front and rear end covers, a cylindrical housing, a controller, a stator, and a rotor. The front and rear end covers are respectively disposed on the both ends of the cylindrical housing. The stator and rotor are disposed inside the cylindrical housing. A bearing chamber is provided at the center of the front and rear end covers. Bearings are placed in the bearing chamber and a revolving shaft is supported on the bearing. The controller includes a box, a PCB board, and electronic components, with the box connected to the rear end cover. Disadvantages of the DC brushless motor are summarized below: 1) As the parts are too many, the structure is complicated and the manufacturing cost is high; 2) The cavity where the stator is located and the space where the PCB board and electronic components are located are separated by the rear end cover, which is not good for air circulation and thermal dissipation; 3) The structure is not compact as a result of the space occupancy by the long axial length and large volume.

SUMMARY OF THE INVENTION

In view of the above-described problems, it is one objective of the invention to provide a motor featuring simple structure, low cost, easy thermal dissipation, small axial dimension, compact construction, and easy assembly.

To achieve the above objective, in accordance with one embodiment of the invention, there is provided a motor comprising a housing, a stator assembly, a rotor assembly, a controller, and a top end cover, wherein the housing comprises a cavity; the stator assembly comprises a stator core and a stator winding and is housed in the cavity and fitted with the housing; the top end cover is disposed on the top of the housing; the rotor assembly comprises a permanent magnet, a revolving shaft, and a rotor support; a bearing support extends inward from the center of a top end face of the top end cover, with a bearing chamber respectively provided on both ends thereof; bearings are disposed inside the bearing chambers and the revolving shaft is disposed into and supports the bearing; the rotor support is connected with a tail of the revolving shaft; a connection kit extends from the edge of the rotor support and outside the bearing support; the permanent magnet is disposed on the connection kit and the stator assembly is provided outside the permanent magnet.

In a class of this embodiment, the controller comprises a box comprising a chamber, a PCB board, and electronic components, with the electronic components provided on the PCB board, the PCB board disposed inside the chamber of the box, and the chamber and the cavity interconnected.

In a class of this embodiment, the bottom of the housing is open and connected with the box of the controller.

In a class of this embodiment, a magnetic ring is disposed at the bottom of the rotor support, and a Hall element is disposed on the stator assembly and the position thereof corresponds to the position of the magnetic ring.

In a class of this embodiment, the stator assembly is electrically connected to the PCB board via a connector plug.

In a class of this embodiment, the stator assembly comprises the stator core, the stator winding, and an end insulator, with the Hall element disposed on the end insulator.

In a class of this embodiment, a rotor core is disposed between the permanent magnet and the connection kit.

In a class of this embodiment, the housing and the top end cover are die-cast as a whole.

In a class of this embodiment, a number of vents are disposed on the housing.

Advantages of the invention are summarized below:

1) The bearing support extends inward from the center of the top end face of the top end cover, with the bearing chamber respectively provided on both ends thereof. The rotor support is connected with a tail of the revolving shaft. The connection kit extends from the edge of the rotor support and outside the bearing support. The permanent magnet is disposed on the connection kit and the stator assembly is provided outside the permanent magnet. Thus, a rear end cover of the motor is omitted, the cavity where the stator is located is interconnected with space where the PCB board and electronic component are positioned, as a result of which, the volume of the cavity is increased and the air convection and thermal dissipation are made easier, providing a novel structure;

2) The omission of the rear end cover simplifies the motor and reduces the cost. With the housing bottom open and connected with the box of the controller, the assembly is simplified;

3) As the revolving shaft is disposed into and supports the top end cover, the axial distance thereof becomes short, thereby shortening the axial dimension of the motor and making the structure more compact;

4) With a number of vents provided on the housing, the air circulation through the motor is accelerated, thereby facilitating the thermal dissipation;

5) The magnetic ring is disposed at the bottom of the rotor support, and the Hall element is disposed on the stator assembly and the position thereof corresponds to the position of the magnetic ring, which provides a novel structure and benefits testing the performance of the rotor; and 6) The housing and the top end cover is die cast as a whole, thereby simplifying the structure of the motor to a greater extent.

DETAILED DESCRIPTION OF THE EMBODIMENTS

For further illustrating the invention, experiments detailing a motor are described below. It should be noted that the following examples are intended to describe and not to limit the invention.

Figure 1:
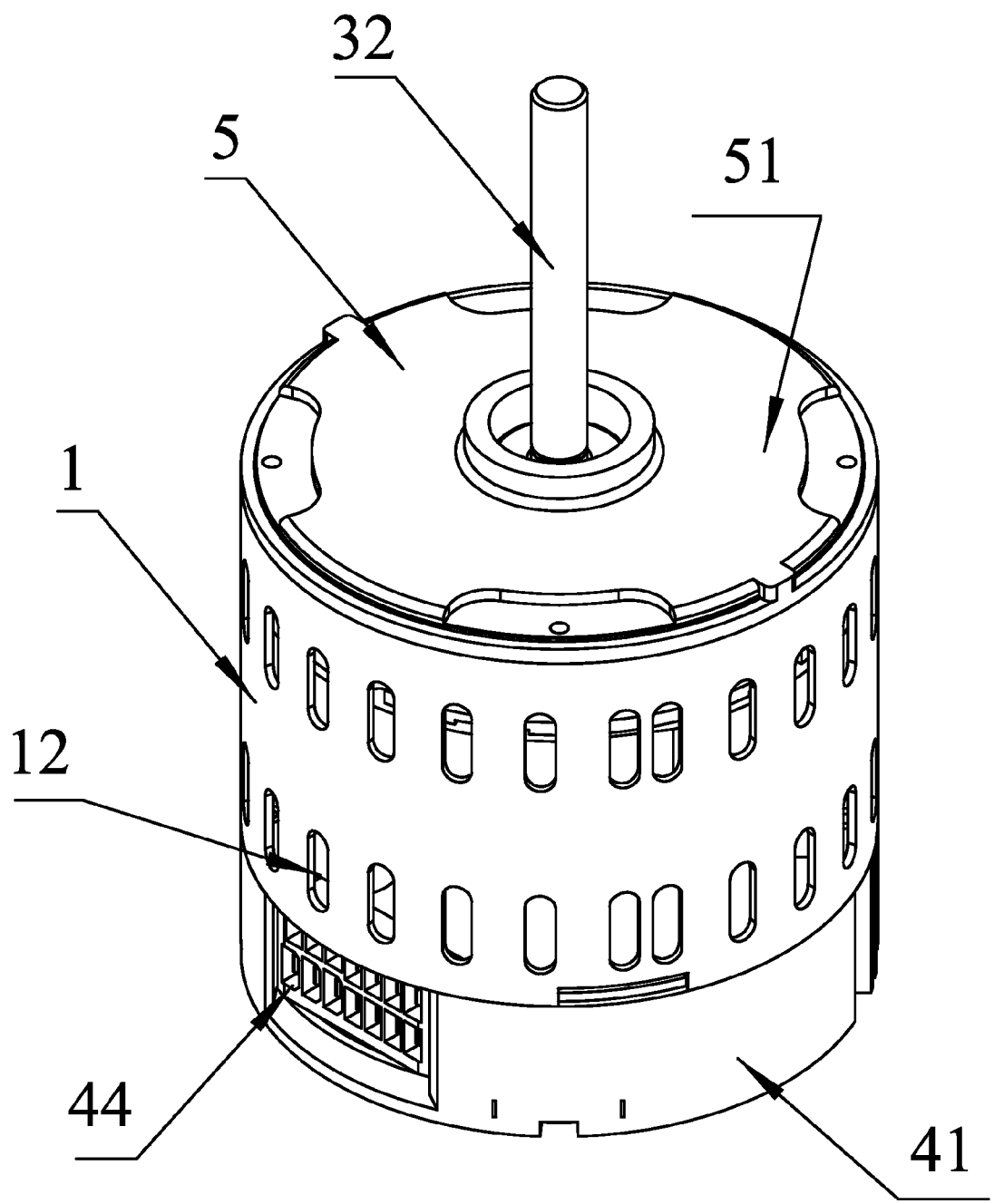
FIG. 1 is a three-dimensional drawing of a motor according to one embodiment of the invention.
Figure 2:
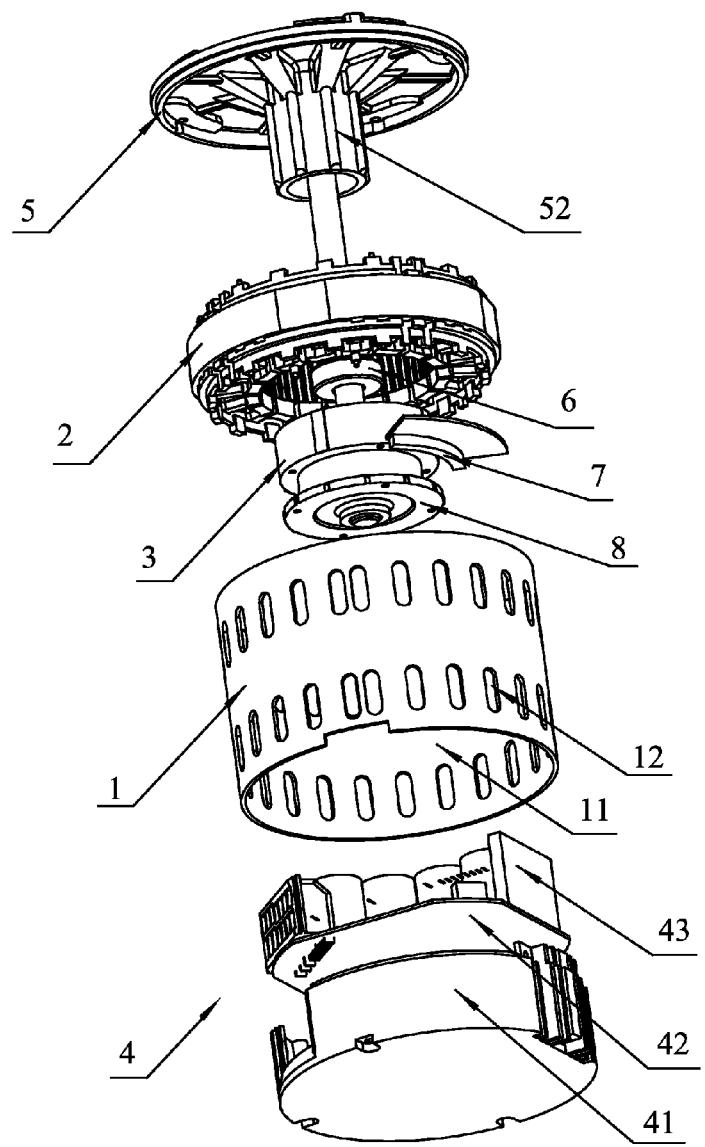
FIG. 2 is an explosive view of a motor of FIG. 1 according to one embodiment of the invention.
Figure 3:
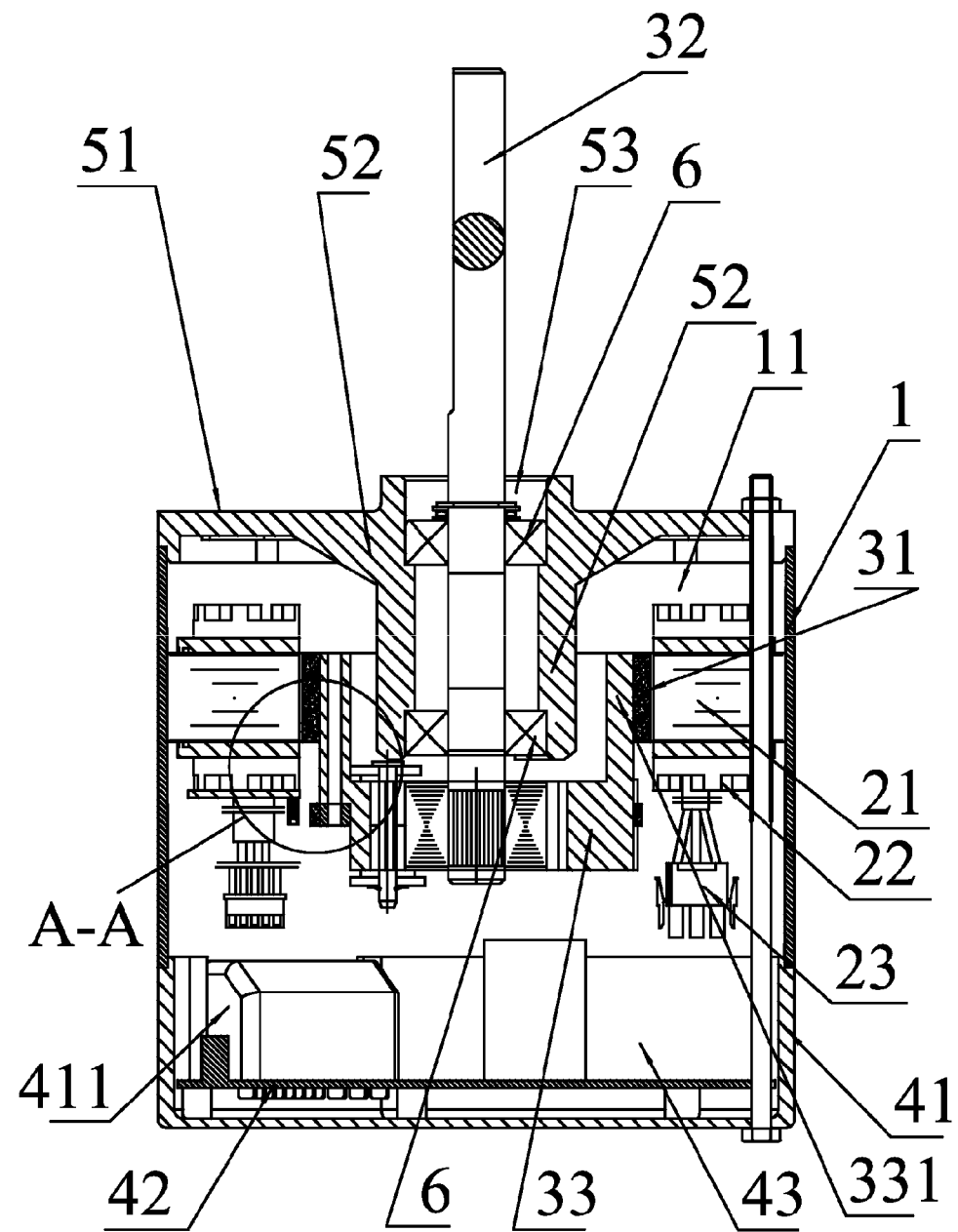
FIG. 3 is a sectional view of a motor according to one embodiment of the invention.
Figure 4:
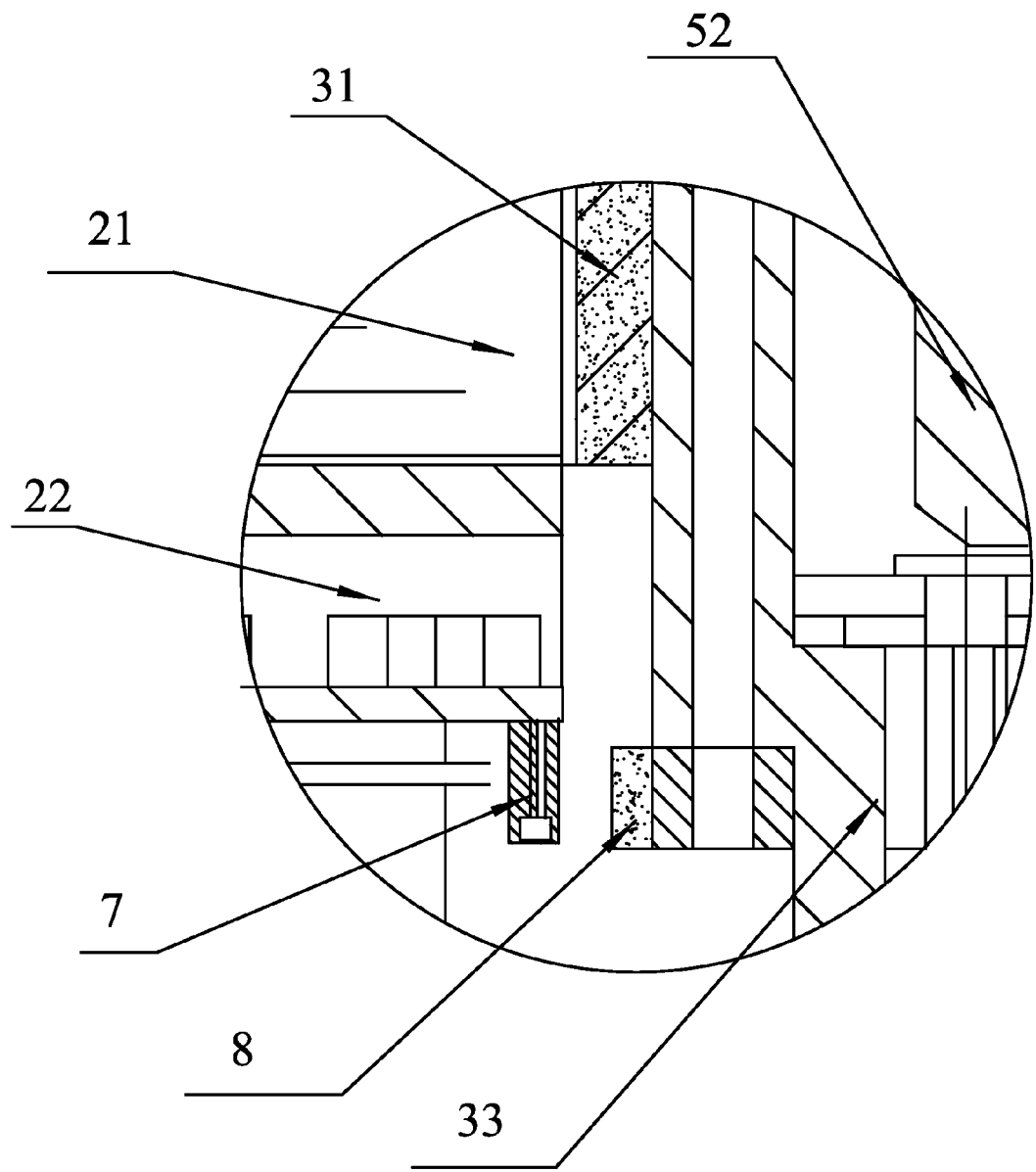
FIG. 4 is a partial enlarged view take from line A-A of FIG. 3 according to one embodiment of the invention.

As shown in FIGS. 1-4, a motor comprises a housing 1, a stator assembly 2, a rotor assembly 3, a controller 4, and a top end cover 5. The housing 1 comprises a cavity 11. The stator assembly 2 comprises a stator core and a stator winding and is housed in the cavity 11 and fitted with the housing 1. The top end cover 5 is disposed on the top of the housing 1. The rotor assembly 3 comprises a permanent magnet 31, a revolving shaft 32, and a rotor support 33. A bearing support 52 extends inward from the center of a top end face 51 of the top end cover 5. A bearing chamber 53 is respectively provided on both ends of the bearing support 52. Bearings 6 are disposed inside the bearing chamber 53 and the revolving shaft 32 is disposed into and supports the bearing 6. The rotor support 33 is connected with a tail of the revolving shaft 32. A connection kit 331 extends from the edge of the rotor support 33 and outside the bearing support 52. The permanent magnet 31 is disposed on the connection kit 331 and the stator assembly 2 is provided outside the permanent magnet 31. The controller 4 comprises a box 41 comprising a chamber 411, a PCB board 42, and electronic components 43. A connection socket 44 is disposed on the box 41. The electronic component 43 is provided on the PCB board 42 which is disposed inside the chamber 411 of the box 41. The chamber 411 is interconnected with the cavity 11. The bottom of the housing 1 is open and connected with the box 41 of the controller 4. A magnetic ring 8 is disposed at the bottom of the rotor support 33. A Hall element 7 is disposed on the stator assembly 2 and the position thereof corresponds to that of the magnetic ring 8. The stator assembly 2 is electrically connected to the PCB board 42 via a connector plug 23. The stator assembly 2 comprises the stator core 21, the stator winding, and an end insulator 22. The Hall element 7 is disposed on the end insulator 22. A rotor core may be disposed between the permanent magnet 31 and the connection kit 331. The housing 1 and the top end cover 5 are die cast as a whole, with a number of vents 12 provided on the housing 1.

Characteristics of the motor and technical effect resulting therefrom are described below. The bearing support 52 extends inward from the center of the top end face 51 of the top end cover 5, with the bearing chamber 53 provided respectively on both ends of the bearing support 52. The bearings 6 are disposed inside the bearing chamber 53. The revolving shaft 32 is disposed into and supports the bearings 6. The rotor support 33 is connected with the tail of the revolving shaft 32. The connection kit 331 extends from the edge of rotor support 33 and outside the bearing support 52. The permanent magnet 31 is disposed on the connection kit 331. The stator assembly 2 is provided outside the permanent magnet 31. The bottom of the housing 1 is open and connected with the box 41 of the controller 4. Thus, the rear end cover structure of the motor is omitted, and the chamber 411 of the box 41 is interconnected with the cavity 11 of the housing 1, as a result of which, the volume of the cavity is increased and the air convection and thermal dissipation are made easier, leading to a novel structure, easy assembly and lower manufacturing cost. As the revolving shaft 32 is disposed into and supports the top end cover 5, the axial distance thereof becomes short, thereby shortening the axial dimension of the motor and making the structure more compact. The magnetic ring 8 is disposed at the bottom of the rotor support 33 and the Hall element 7 is disposed on the stator assembly 2 and the position thereof corresponds to that of the magnetic ring 8, which provides a novel structure and benefits testing the performance of the rotor 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor comprising:
   a) a housing (1) comprising a peripheral wall, a plurality of air vents, and a bottom;
   b) a stator assembly (2), said stator assembly (2) comprising a stator core and a stator winding, said stator core comprising an outer peripheral surface;
   c) a rotor assembly (3);
   d) a controller (4), said controller (4) comprising a box (41); and
   e) a top end cover (5);
   wherein:
   said housing (1) comprises a cavity (11);
   said plurality of air vents is arranged on said peripheral wall;
   said stator assembly (2) is housed in said cavity (11) and fitted with said housing (1);
   said outer peripheral surface is in contact with an inner side of said peripheral wall;
   openings in a part of said plurality of air vents are positioned toward said outer peripheral surface;
   said top end cover (5) is disposed on the top of said housing (1);
   said rotor assembly (3) comprises a permanent magnet (31), a revolving shaft (32), and a rotor support (33);
   a bearing support (52) extends inward from the center of a top end face (51) of said top end cover (5);
   a bearing chamber (53) is provided on both ends of said bearing support (52);
   two bearings (6) are disposed inside said bearing chamber (53) and are supported by said bearing support (52);
   said revolving shaft (32) is disposed in and is supported by said two bearings (6);
   said rotor support (33) is connected with a tail of said revolving shaft (32);
   said housing (1) is connected to said box (41);
   said box (41) comprises a chamber (411);
   the bottom of said housing (1) and the top of said box (41) are open;
   the cavity (11) is open to the chamber (411);
   the bottom surface of said rotor assembly (3) directly faces the top of said box (41);
   a connection kit (331) extends from the edge of said rotor support (33) and outside said bearing support (52); and
   said permanent magnet (31) is disposed on said connection kit (331) and said stator assembly (2) is provided outside said permanent magnet (31).

2. The motor of claim 1, wherein said controller (4) further comprises a PCB board (42) and electronic components (43), said electronic components (43) are provided on said PCB board (42), and said PCB board (42) is disposed inside said chamber (411).

3. The motor of claim 2, wherein a magnetic ring (8) is disposed at the bottom of said rotor support (33), a Hall element is disposed on said stator assembly (2), and a position of said Hall element corresponds to a position of said magnetic ring (8).

4. The motor of claim 3, wherein said stator assembly (2) is electrically connected to said PCB board (42) via a connector plug (23).

5. The motor of claim 4, wherein said stator assembly (2) further comprises an end insulator (22), and said Hall element (7) is disposed on said end insulator (22).

6. The motor of claim 3, wherein said housing (1) and said top end cover (5) are die-cast as a whole.

7. The motor of claim 1, wherein a magnetic ring (8) is disposed at the bottom of said rotor support (33), a Hall element is disposed on said stator assembly (2), and a position of said Hall element corresponds to a position of said magnetic ring (8).

8. The motor of claim 7, wherein said stator assembly (2) is electrically connected to said PCB board (42) via a connector plug (23).

9. The motor of claim 8, wherein said stator assembly (2) further comprises an end insulator (22), and said Hall element (7) is disposed on said end insulator (22).

10. The motor of claim 7, wherein said housing (1) and said top end cover (5) are die-cast as a whole.

11. The motor of claim 1, wherein when in use, said rotor assembly (3) rotates about the axis of said revolving shaft (32) and causes air around the assembly (3) to circulate within the cavity (11) and the chamber (411) and to dissipate heat generated by said rotor assembly (3) and said controller (4).

12. The motor of claim 1, wherein a part of the outer peripheral surface is exposed to a surrounding environment via the openings of the part of said plurality of air vents; and when in use, air passing over the part of said plurality of air vents directly contacts the stator core to cool down the stator core.

13. A motor, comprising:
a) a housing (1), said housing comprising a peripheral wall, a first plurality of air vents, a second plurality of air vents, a top, and a bottom, said peripheral wall comprising an upper part and a lower part;
b) a stator assembly (2), said stator assembly (2) comprising a stator core and a stator winding, said stator core comprising an outer peripheral surface;
c) a rotor assembly (3), said rotor assembly (3) comprising a permanent magnet (31), a revolving shaft (32), and a rotor support (33);
d) a controller (4), said controller (4) comprising a box (41); and
e) a top end cover (5), said top end cover (5) comprising a top end face (51);
wherein:
said housing (1) comprises a cavity (11);
said first plurality of air vents is arranged on said upper part;
said second plurality of air vents is arranged on said lower part;
said stator assembly (2) is housed in said cavity (11);
said outer peripheral surface is in contact with an inner side of said peripheral wall, wherein said outer peripheral surface substantially covers said first plurality of air vents and a part of said outer peripheral surface is exposed to a surrounding environment through said first plurality of air vents;
said top end cover (5) is disposed on the top of said housing (1);
a bearing support (52) extends inward from a center of the top end face (51);
a bearing chamber (53) is provided on both ends of said bearing support (52);
two bearings (6) are disposed inside said bearing chamber (53) and are supported by said bearing support (52);
said revolving shaft (32) is disposed in and is supported by said two bearings (6);
said rotor support (33) is connected to a tail of said revolving shaft (32);
said housing (1) is connected to said box (41);
said box (41) comprises a chamber (411);
the bottom of said housing (1) and a top of said box (41) are open;
the cavity (11) is open to the chamber (411);
the bottom surface of said rotor assembly (3) directly faces the top of said box (41);
a connection kit (331) extends from the edge of said rotor support (33) and is arranged outside said bearing support (52); and
said permanent magnet (31) is disposed on said connection kit (331) and said stator assembly (2) is provided outside said permanent magnet (31).

14. The motor of claim 13, wherein said controller (4) further comprises a PCB board (42) and electronic components (43), said electronic components (43) are provided on said PCB board (42), and said PCB board (42) is disposed inside said chamber (411).

15. The motor of claim 13, wherein a magnetic ring (8) is disposed at the bottom of said rotor support (33), a Hall element is disposed on said stator assembly (2), and a position of said Hall element corresponds to a position of said magnetic ring (8).

16. The motor of claim 13, wherein when in use, air passing over said first plurality of air vents directly contacts the stator core to cool down the stator core.

\* \* \* \* \*